United States Patent [19]

Won

[11] Patent Number: 5,068,157
[45] Date of Patent: Nov. 26, 1991

[54] ELECTROLUMINESCENT ELEMENT

[75] Inventor: Song Won, Susung-Ku, Rep. of Korea

[73] Assignee: Samsung Electron Devices Co., Ltd., Rep. of Korea

[21] Appl. No.: 427,193

[22] Filed: Oct. 26, 1989

[30] Foreign Application Priority Data

Oct. 26, 1988 [KR] Rep. of Korea ............ 88-13985[U]

[51] Int. Cl.⁵ .......................... H01J 1/62; B05D 5/06
[52] U.S. Cl. ................................... 428/690; 313/503; 313/509; 313/512; 427/66; 428/917
[58] Field of Search ............... 313/503, 504, 509, 512; 428/917, 690; 427/64, 66

[56] References Cited

U.S. PATENT DOCUMENTS

| | | | |
|---|---|---|---|
| 4,593,228 | 6/1986 | Albrechtson et al. | 313/509 |
| 4,684,353 | 8/1987 | deSouza | 428/917 |
| 4,708,914 | 11/1987 | Kamijo | 313/509 |
| 4,767,679 | 8/1988 | Kawachi | 428/690 |
| 4,876,481 | 10/1989 | Taniguchi et al. | 313/509 |

FOREIGN PATENT DOCUMENTS

56-41291  4/1981  Japan .

*Primary Examiner*—James J. Seidleck
*Attorney, Agent, or Firm*—Christie, Parker & Hale

[57] ABSTRACT

An electroluminescent element is disclosed in which the phosphor layer is composed of a ZnS phosphor added with the solution of $BaTiO_3$ and $In_2O_3$. The layer produces a strongly electric field, and is capable of having a high luminance under the condition of a low applied voltage.

7 Claims, 1 Drawing Sheet

ELECTROLUMINESCENT ELEMENT

FIELD OF THE INVENTION

The present invention relates to electroluminescent elements (each element to be called "EL element") and more particularly to an EL element provided with a phosphor layer in which the phosphor material is composed of $BaTiO_3$ as the insulating materials and $In_2O_3$ as the conductive materials to provide an electric field therein.

BACKGROUND OF THE INVENTION

As shown in FIG. 1, there is illustrated a sectional view of an electroluminescent dispersing EL element, in which on a first electrode 1 is deposited on an insulating layer 2 protection from electric short and for reflection of light.

Subsequently, on the insulating layer 2 is deposited a phosphor layer 3 containing insulating materials. A second electrode 4 is deposited on the phosphor layer 3 and is a transparent conductive layer. Thereafter the EL element is completed by sealing the layers with a moisture-proof and high transmission enclosing film 5.

The phosphor layer 3 is formed of ZnS phosphor containing an insulating resin such as cyanoethyl resin, and is of a dispersing type.

It has been found that the EL element thus formed allows light to be emitted a forming high electric field therein when an AC source is applied to the first and second electrodes 1, and 4.

A problem occurs when the phosphor layer composed of the ZnS phosphor containing insulating resin such as cyanoethyl resin, is omitted because the EL element has been found to be limited in the range of luminance due to the dielectric constant being less then 25.

SUMMARY OF THE INVENTION

In order to prevent the above problem and to achieve an improved EL element, it is an object of the present invention to provide an EL element in which the phosphor layer is produced with phosphor material, which is composed of insulating materials having high dielectric constant and conductive material, after mixing an insulating solution such as cyanoethyl resin therein.

An EL element manufactured in accordance with an embodiment of the present invention comprises a phosphor layer having ZnS phosphor mixed with insulating resin such as cyanoethyl resin. The insulating material has a material with a high dielectric constant, such as $BaTiO_3$, and conductive material such as $In_2O_3$, thereby having high luminance under the condition of the low voltage applied to the electrodes owing to partially forming a strong electric field within the phosphor layer.

BRIEF DESCRIPTION OF THE DRAWING

The object and other advantages of the present invention will become more apparent with reference to the attached drawing in which.

FIG. is a sectional view of a conventional EL element.

DESCRIPTION OF THE PREFERRED EMBODIMENT

Figure 2:
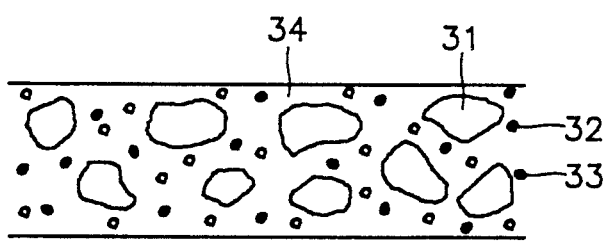
FIG. 2 is a sectional view showing the structure of only the phosphor layer manufactured in accordance with an embodiment of the present invention.

Referring now to FIG. 2, there is shown a sectional view of the structure of only the phosphor layer manufactured in accordance with an embodiment of the present invention.

Figure 1:
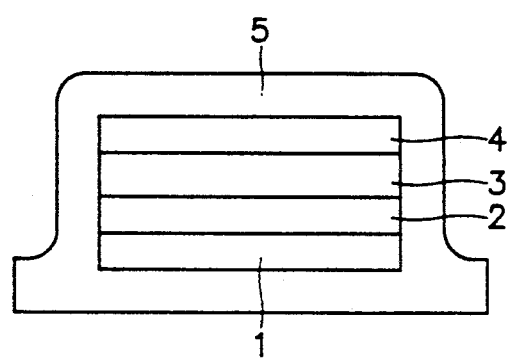

First, an insulating layer 2 is deposited upon the face of a first electrode 1 with the compound, which is composed of an insulating material, such as cyanoethyl resin, in the range of 20 to 40wt %, added with acetonitrile ($_2C_3HCN$) and dimethylformamide ($HCON(CH_{32})$) in the range of 60 to 80%, and added with barium titanate ($BaTiO_3$) as high dielectric material, and thereafter the insulating layer 2 is placed at a temperature of about 80 degrees C., dried and fired for 10 to 20 minutes, as noted herein often in connection with FIG. 1.

The insulating material is a highly polymerized organic material such as cyanoethyl resin, which may be realized in the present invention.

Subsequently, a phosphor layer 3 is deposited upon the insulating layer 2. The phosphor layer 3 compound, which is composed of a solution of ZnS phosphor in the range of 50 to 75% and insulating material in the range of 20 to 30%, added with the indium oxide ($In_2O_3$) in the range of 5 to 10% and barium titanate in the range of 5 to 10% in order for forming partially the high electric field within the phosphor layer 3, and therefore the phosphor layer may be manufactured by a conventional process such as a Screen printing method and Dactor blad method.

The indium oxide has high conductive characteristics, and the compound added with the materials of various kinds as noted above has been mixed by the Ball Mill process as a general mixing a process for two hours.

Subsequently, a second electrode 4 is coated on the face of the phosphor 3. The EL element is completed by sealing the above noted layers with a moisture-proof and high light transmission enclosing film 5. The enclosing film 5 is composed of poly chloro tri fluro ethylene and is sealed around the layers as manufactured above.

Referring now to FIG. 2, there is illustrated a sectional view of a phosphor layer according to the invention.

Reference number 31 is the phosphor particles, 32, 33 and 34 indicate the insulating particles having a high dielectric constant, the conductive particles and the cyanoethyl resin, respectively.

In operation of the EL element manufactured in accordance with the present invention, when AC source is applied to the first and second electrodes 1 and 4, it has been found that the phosphor layer 3 is capable of having partially a high electric field owing to the $BaTiO_3$ and $In_2O_3$, thereby having a high luminance under the condition of low voltage.

Accordingly, the EL element manufactured according to the present invention is provide with a phosphor layer having $BaTiO_3$ and $In_2O_3$, and the phosphor layer produces a strong electric field, and is capable of having a high luminance even under the condition of a low voltage.

What is claimed is:

1. An electroluminescent element capable of high luminescence under low voltage comprising first and second electrodes with insulating and phosphor layers therebetween; said element comprising a first electrode, an insulating layer comprising cyanoethyl resin, a phosphor layer deposited upon the insulating layer, a second electrode on the phosphor layer and an enclosing film sealing said layers, said phosphor layer comprising ZnS phosphor to which has been added a solution of an organic insulating material, barium titanate and indium oxide.

2. An electroluminescent element according to claim 1 wherein said solution of organic insulating material comprises cyanoethyl resin.

3. An electroluminescent element according to claim 1 wherein said insulating layer comprises 20% to 40% by weight cyanoethyl resin and 60% and 80% by weight of a mixture of acetonitrile, dimethylformamide and barium titanate.

4. An electroluminescent element according to claim 1 wherein said phosphor layer comprises, in wt %, 50% to 75% ZnS phosphor, 20% to 30% cyanoethyl resin, 5% to 10% indium oxide and 5% to 10% barium titanate.

5. A method of making an electroluminescent element capable of high luminescence under low voltage comprising:

providing a first electrode with an outer and an inner face;

applying an insulating layer containing cyanoethyl resin onto the inner face of said first electrode;

preparing a mixture of ZnS phosphor, cyanoethyl resin, indium oxide and barium titanate;

applying said ZnS phosphor-containing mixture onto said insulating layer to provide a phosphor layer;

applying a second electrode onto the phosphor layer; and sealing said layers with an enclosing film of moisture proof material of high luminescent transmission.

6. A method according to claim 5 further comprising preparing an insulating layer of material comprising, in wt %, 20% to 40% cyanoethyl resin and 60% to 80% of a mixture of acetonitrile, dimethylformamide and barium titanate, and depositing said insulating layer material onto the inner face of the first electrode.

7. A method according to claim 5 further comprising preparing a mixture of, in wt %, 50% to 75% ZnS phosphor, 20% to 30% cyanoethyl resin, 5% to 10% indium oxide and 5% to 10% barium titanate, and depositing said ZnS phosphor-containing mixture onto said insulating layer.

* * * * *